United States Patent
McQueen et al.

(10) Patent No.: US 10,325,127 B2
(45) Date of Patent: Jun. 18, 2019

(54) IMAGING READER WITH LOW STRAY VISIBILITY ILLUMINATION

(71) Applicant: Datalogic USA, Inc., Eugene, OR (US)

(72) Inventors: Alexander M. McQueen, Eugene, OR (US); Michael J. Ahten, Eugene, OR (US)

(73) Assignee: DATALOGIC USA, INC., Eugene, OR (US)

(*) Notice: Subject to any disclaimer, the term of this patent is extended or adjusted under 35 U.S.C. 154(b) by 213 days.

(21) Appl. No.: 15/377,873

(22) Filed: Dec. 13, 2016

(65) Prior Publication Data
US 2018/0165489 A1 Jun. 14, 2018

(51) Int. Cl.
*G06K 15/00* (2006.01)
*G06K 7/10* (2006.01)
*F21V 7/22* (2018.01)
*F21V 3/00* (2015.01)
*F21Y 115/10* (2016.01)

(52) U.S. Cl.
CPC ............ *G06K 7/10742* (2013.01); *F21V 3/00* (2013.01); *F21V 7/22* (2013.01); *G06K 7/1096* (2013.01); *G06K 7/10722* (2013.01); *G06K 7/10831* (2013.01); *G06K 7/10861* (2013.01); *F21Y 2115/10* (2016.08)

(58) Field of Classification Search
CPC ........... G06K 7/10742; G06K 7/10732; G06K 7/10881; G06K 7/1417; G06K 2207/1011; G06K 7/10574; G06K 7/10861; G02B 6/0065; G02B 6/0068; G02B 6/0073; G02B 6/0091

USPC .......................................................... 235/383
See application file for complete search history.

(56) References Cited

U.S. PATENT DOCUMENTS

| | | | |
|---|---|---|---|
| 5,276,591 A * | 1/1994 | Hegarty | G02B 6/0036 362/2 |
| 8,894,257 B2 | 11/2014 | Rice et al. | |
| 8,919,651 B2 | 12/2014 | Gao et al. | |
| 9,135,484 B2 | 9/2015 | Shearin et al. | |
| 9,305,198 B2 | 4/2016 | Thompson et al. | |
| 2003/0029917 A1* | 2/2003 | Hennick | G06K 7/10732 235/454 |
| 2003/0082282 A1* | 5/2003 | Krochta | A23B 9/14 426/302 |
| 2003/0089776 A1* | 5/2003 | Hennick | G06K 7/10732 235/454 |

(Continued)

*Primary Examiner* — Thien M Le
(74) *Attorney, Agent, or Firm* — Stoel Rives LLP

(57) ABSTRACT

A data reading system and method, such as for reading optical codes on objects being passed through a read zone, including one or more imagers and at least one illumination module having a reflector housing that includes a baffle structure with a first inner surface and a second inner surface, and a light source disposed at the rear end of the reflector housing and operative to generate illumination out through the baffle structure along an outgoing illumination path, wherein at least one of the inner surfaces of the baffle structure comprises a dielectric material operative to exhibit high reflectivity to light rays from the light source impinging at a high incidence angle and to exhibit low reflectivity to light rays from the light source impinging at a low incidence angle, thereby minimizing stray light impinging on the eyes of the operator while maximizing on-target illumination.

20 Claims, 7 Drawing Sheets

(56) References Cited

U.S. PATENT DOCUMENTS

| | | | |
|---|---|---|---|
| 2004/0188527 A1* | 9/2004 | Tien | G06K 7/10574 235/462.42 |
| 2005/0191390 A1* | 9/2005 | Krochta | A23G 1/305 426/302 |
| 2007/0090193 A1 | 4/2007 | Nunnink et al. | |
| 2012/0074338 A1* | 3/2012 | Shearin | G06K 7/10742 250/566 |
| 2017/0270329 A1* | 9/2017 | Handshaw | G06K 7/10742 |
| 2018/0055987 A1* | 3/2018 | Strohhofer | A61M 1/367 |

* cited by examiner

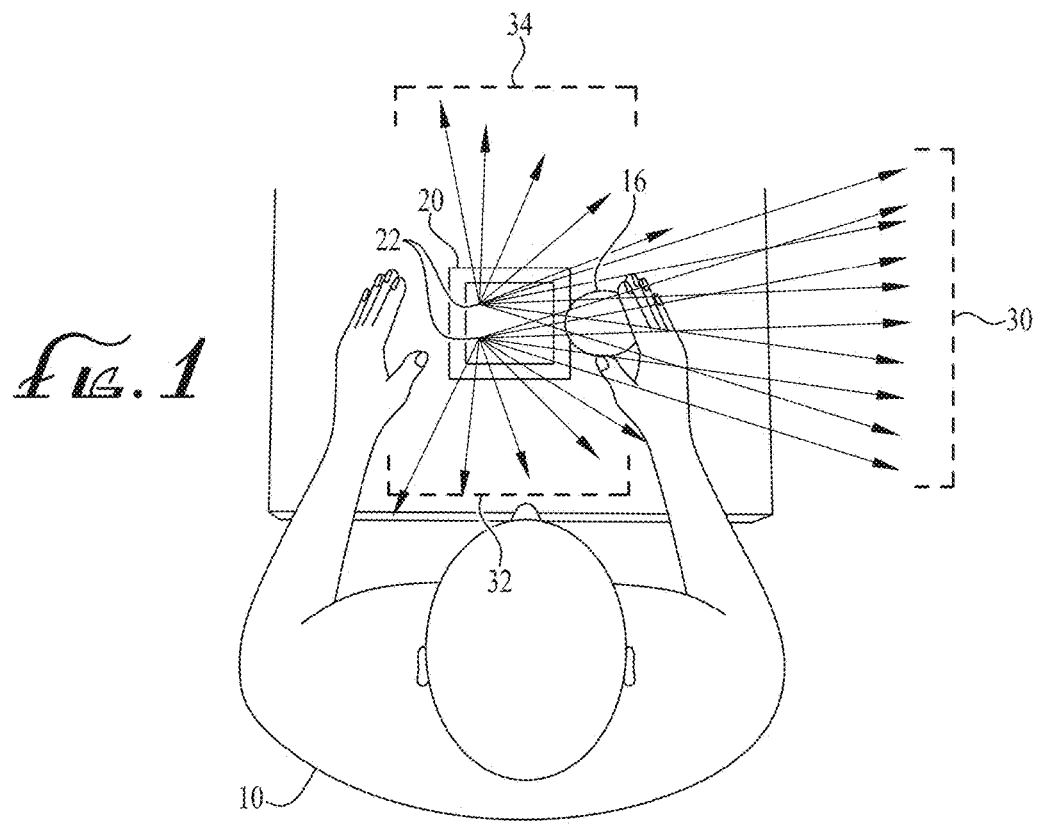
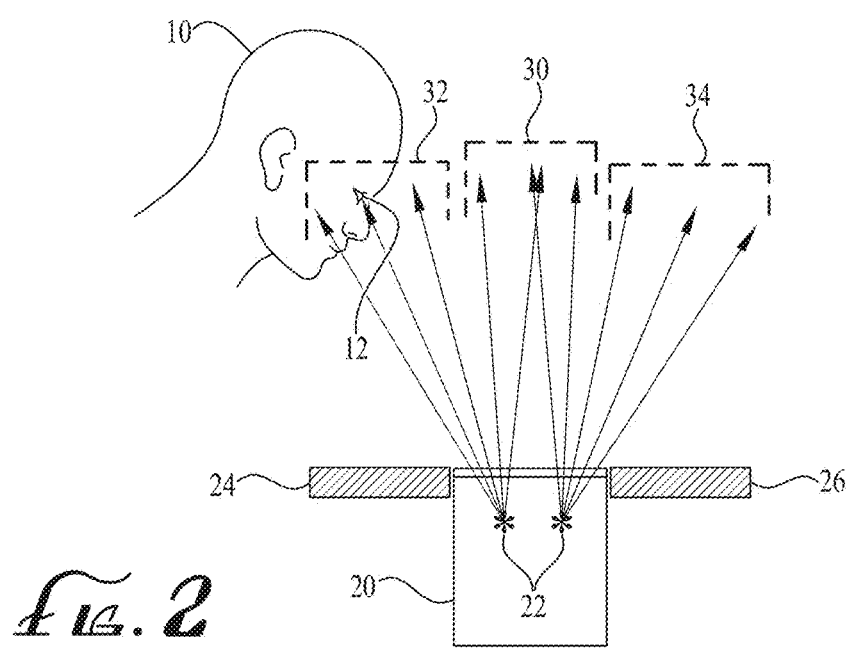

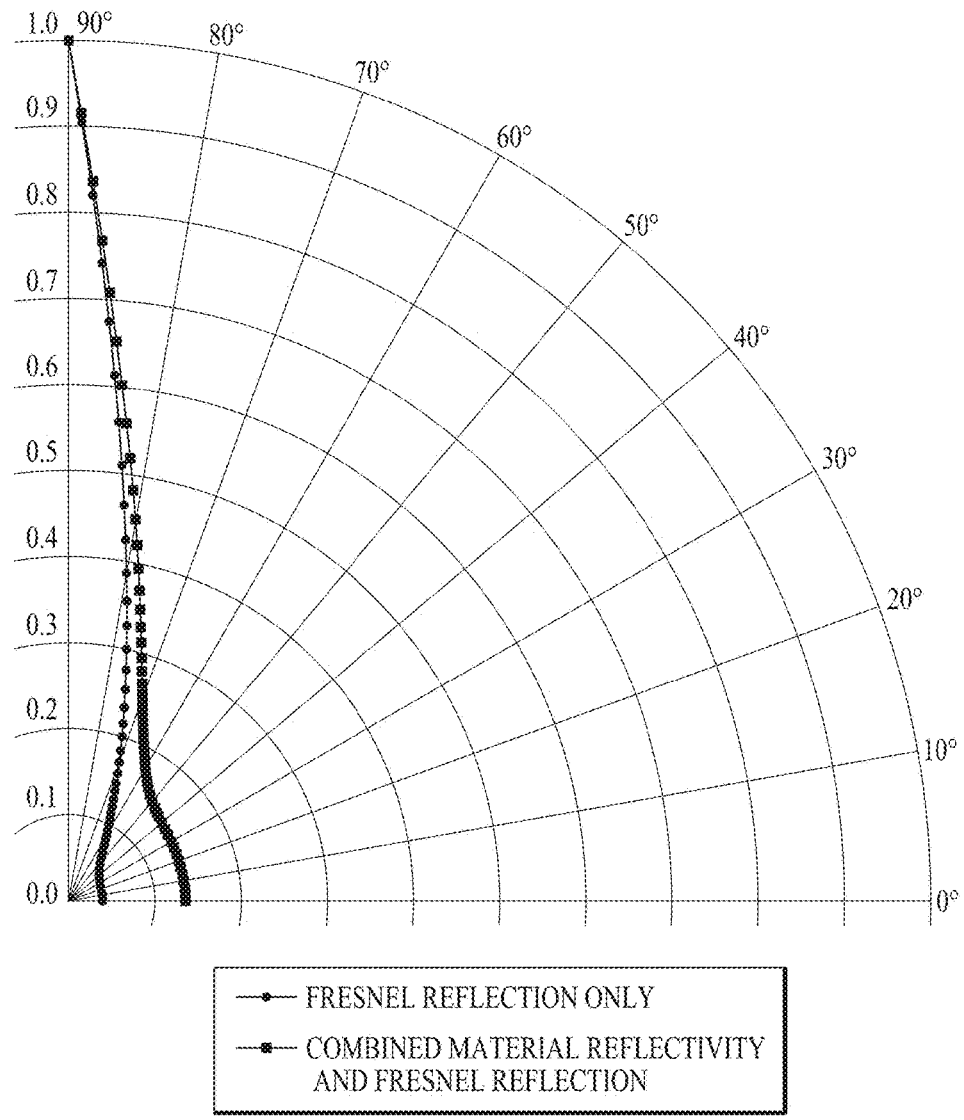

IMAGING READER WITH LOW STRAY VISIBILITY ILLUMINATION

BACKGROUND

The field of this disclosure relates generally to systems and methods for data reading and/or image capture, and more particularly, to illumination systems particularly applicable to imaging data readers.

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes.

Data reading devices are well known for reading UPC and other types of optical codes on packages, particularly in retail stores. One common data reader in such systems is an imaging reader that employs an imaging device or a sensor array, such as a CCD (charge coupled device) or CMOS (complementary metal oxide semiconductor) device. Imaging readers can be configured to read both 1-D and 2-D optical codes, as well as other types of optical codes or symbols and images of other items. Though some imaging readers are capable of using ambient light illumination, an imaging reader typically utilizes a light source to illuminate the item being read to provide the required signal response in the imaging device. An imager-based reader utilizes a camera or an imager to generate electronic image data, typically in digital form, of an optical code. The image data is then processed to find and decode the optical code.

Imager-based types of readers, either single plane (e.g., in counter horizontal reader) or dual plane/bioptic style readers (e.g., readers with a horizontal window and a vertical window), are popular for high volume applications. These readers typically have bright illumination sources that are potentially distracting to the operator.

FIG. 1 shows a top view of a common problem with an illumination field for a scanner 20 whose exit angles are not well controlled. In this undesirable case, illumination/light sources 22 have a much wider range of angles over which they emit light. Some of the illumination light propagates in the desired general direction of an incoming object 16, represented by rays 30. Some portion of the light not emitted in the direction of the rays 30 may go in directions roughly orthogonal to the rays 30, represented by rays 32, 34. Some of the rays 32 may travel towards an operator 10 and some of the rays 34 may travel away from the operator 10 (potentially toward the customer).

FIG. 2 is an end view of the undesirable situation previously shown in FIG. 1. A work surface 24 and the scanner 20 are shown in cross-section. The light sources 22 produce light which is not well controlled in exit angle. Light from the lights sources 22 which travels in a desired direction toward the items being scanned is represented by rays 30. Some of the rays 32 which travel in an undesirable direction may enter the eyes 12 of the operator 10. Another set of rays 34 may similarly enter the eyes of customers (not shown) standing on the opposite side of the work surface 26. This "stray" light is not preferred and removing it would be beneficial.

FIG. 3 illustrates a scanner 50 that exhibits a common solution to the stray light problem. The scanner 50 is shown in cross-section and the work surface has been omitted. Only a single light source 52 is shown, and baffles 54, 56 are shown, but there may indeed be an array of light sources and baffles. The representative rays, labelled a, b, c, d, and e exit the scanner 50 through its window 51. It is noted that none of the illumination rays a, b, c, d, e enters the eyes 12 of the operator 10. The extent of the baffles 54, 56 is selected to block rays which would otherwise enter the eyes 12 of the operator 10. Additional baffles to control rays in the directions normal to this page may also be used, but are not shown here for clarity. The inner surfaces of the baffles 54, 56 are made with a light absorbing material, coating, etc. to reduce scatter of light impinging on the inner surfaces of the baffles. An unfortunate consequence of baffling the light sources is that the blocked light is entirely wasted, reducing overall efficiency of the illumination system.

FIG. 4 illustrates another example system of a scanner 60, but with the inner surfaces of baffles 64, 66 being made with reflective metal, or coated with highly reflective coating, such as a metallized layer. This reflective inner surface may be employed to improve the illumination efficiency. In this example, the light source 62 of the scanner 60 is surrounded by the metallized baffles 64, 66, and directs out light rays a, b, c, d, e but also shows that the stray light problem has reappeared. Some light, represented by ray f, reflects from the inner surface of one or more of the baffles 64, 66, exits window 61, and travels into the eyes 12 of the operator 10.

U.S. Pat. No. 9,305,198 at FIG. 19 discloses a system with a pyramid-shaped cone light concentrator with some of the inner surfaces being of high reflectivity (to concentrate the light) and other of the surfaces being low reflectivity (to minimize stray light.

Still, the present inventors have recognized that it is desirable to minimize bright light from the illumination sources of these readers from reaching or interfering with the sight lines of the operator or the customer while also avoiding unnecessary light losses.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings.

FIG. 1 is a diagrammatic top view of a first prior art illumination system for a data reader illustrating stray light rays.

FIG. 2 is a diagrammatic side view of the system of FIG. 1.

FIG. 9 is a plot of combined effects of specular Fresnel reflection and material reflectance.

DETAILED DESCRIPTION OF EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Various imager-based data readers and associated methods are described herein. In the following description of the figures and any example embodiments, it should be understood that any image fields or fields of view related to any imager may be partitioned into two or more regions, each of which may be used to capture a separate view/perspective of the view volume. In addition to providing more views than imagers, such embodiments may enhance the effective view volume beyond the view volume available to a single imager having a single point of view.

In the following description of the figures and any example embodiments, it should be understood that use of the data reader having the described features in a retail establishment is merely one use for such a system and should not be considered as limiting. Other uses for data readers with the characteristics and features described herein may be possible, for example, in an industrial location such as a parcel distribution (e.g., postal) station.

Figure 3:
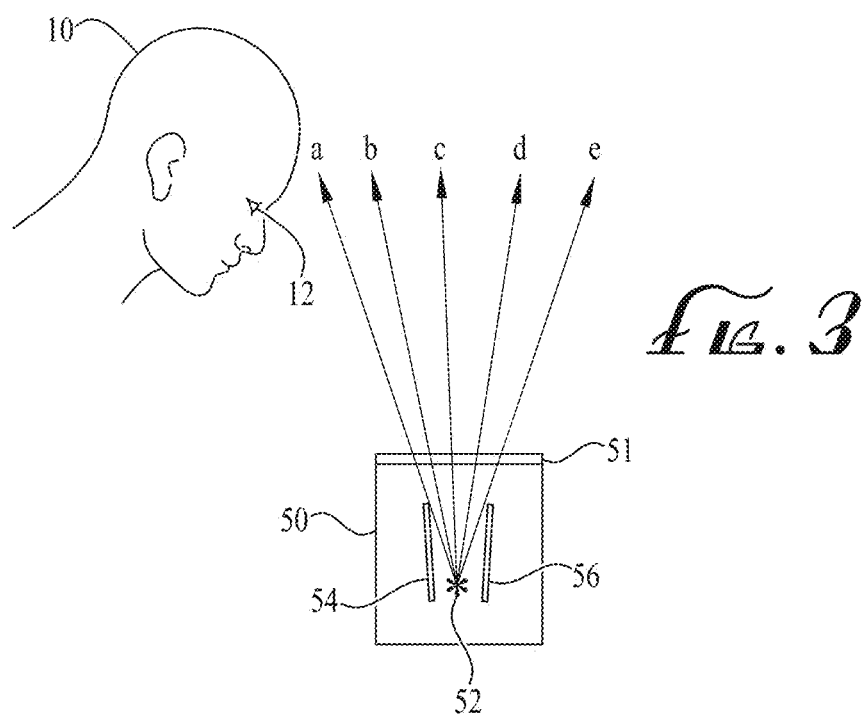
FIG. 3 is a diagrammatic side view of a second prior art illumination system illustrating light rays.
Figure 4:
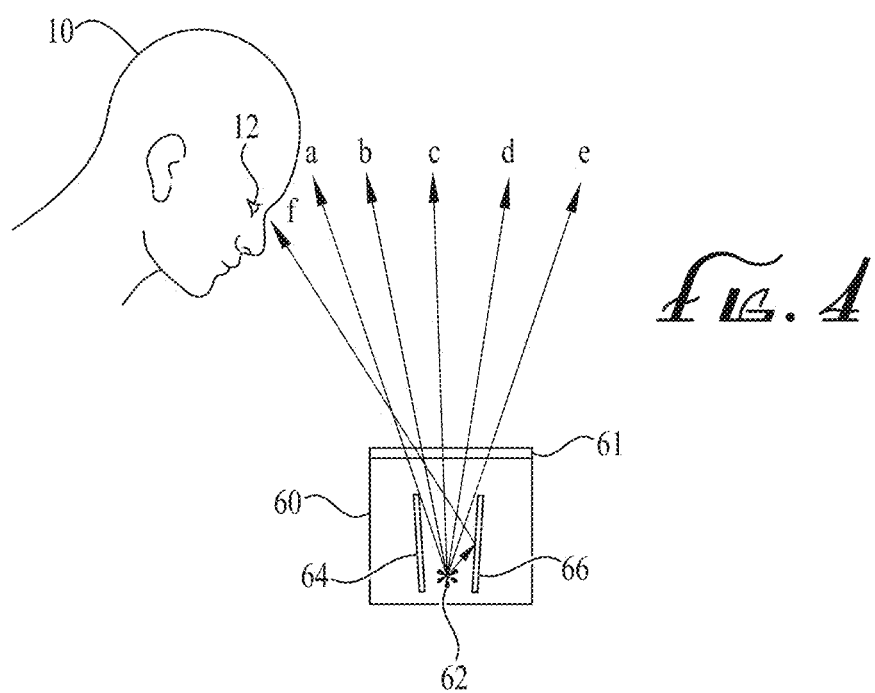
FIG. 4 is a diagrammatic side view of a third prior art illumination system illustrating stray light rays.
Figure 5:
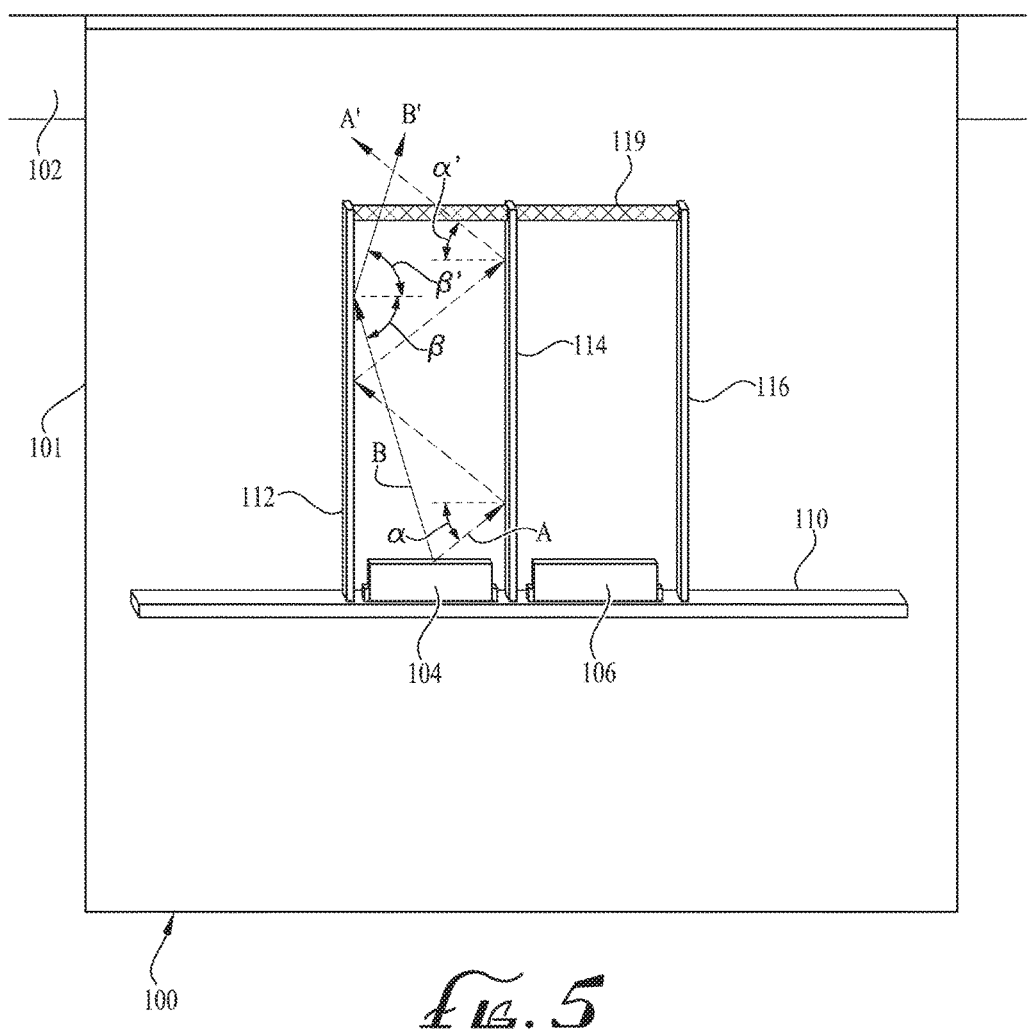
FIG. 5 is a detailed diagrammatic top view of a data reader according to an embodiment.
Figure 6:
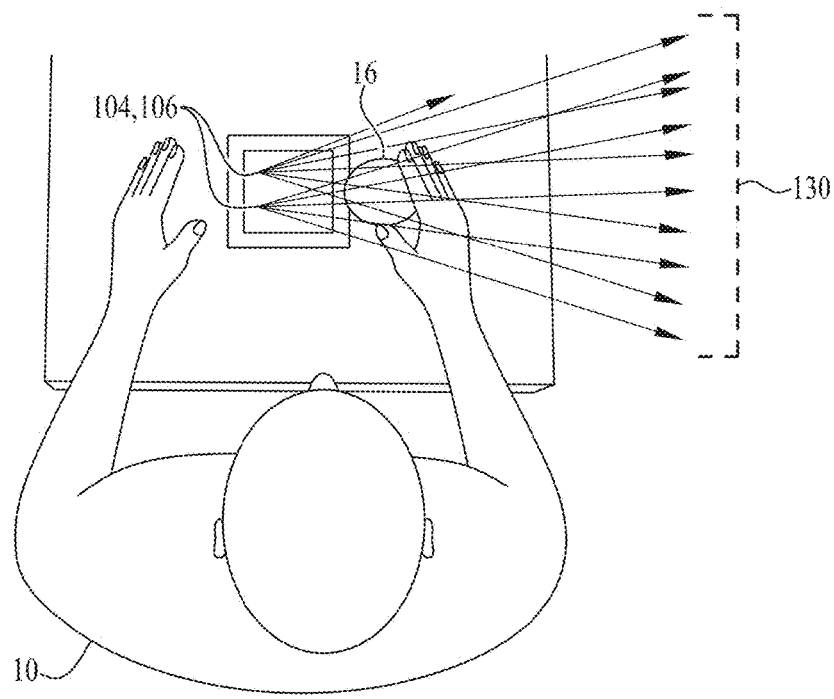
FIG. 6 is a diagrammatic top view of the data reader of FIG. 5.

FIGS. 5-6 illustrate a data reader 100 and an exemplary object 16 that may be passed through a view volume of the data reader 100. The data reader 100 is illustrated in a simplified form as a single window scanner having a reader housing 101 disposed horizontally in a work surface 102 such as a checkstand counter. Alternately, the data reader 100 may comprise a single window disposed vertically, or alternately a multiple-window reader having a lower section (with a horizontal window) and an upper section (with a vertical window). The view volume may be a function of the enclosure and form of the data reader and the perspectives of the views in which images of the objects are captured. A perspective may encompass a location, a direction, an angle, or any combination of the foregoing, or the like, that characterizes a vantage or point of view for seeing, imaging, or visualizing via machine vision, or illuminating the object 16 or a portion thereof.

FIGS. 5-6 illustrate a partial array of illumination sources shown as light emitting diodes (LEDs) 104, 106 and baffles 112, 114, 116 mounted on a printed circuit board 110. The illumination LEDs 104, 106 may emit light over a broad range of angles, represented by incidence angles α and β. The present inventors have recognized that it is desirable to minimize the amount of stray light passing outside the baffles 112, 114, 116 at low incidence angles α', represented by ray A' (which travels so as to reach the eyes of the operator 10), while it is also desirable to maximize light exiting at high incidence angles β', represented by ray B' (which travel in an acceptable direction for illuminating the read region, as shown by rays 130 in FIG. 6). The materials and/or surface treatments of the inner surface of the baffles 112, 114, 116 are selected such that low incidence angle light A is absorbed, while high incidence angle light B is reflected.

In one embodiment, the material of the baffles 112, 114, 116 (or the inner surfaces thereof) may comprise a dielectric material with a smooth or polished surface. If the material is also absorbing, then further stray light reduction is possible.

The baffle design as illustrated is of a simplified geometry, but it may comprise different shapes, tilts or other (additional) baffles to control radiation in the direction normal to the page.

Figure 7:
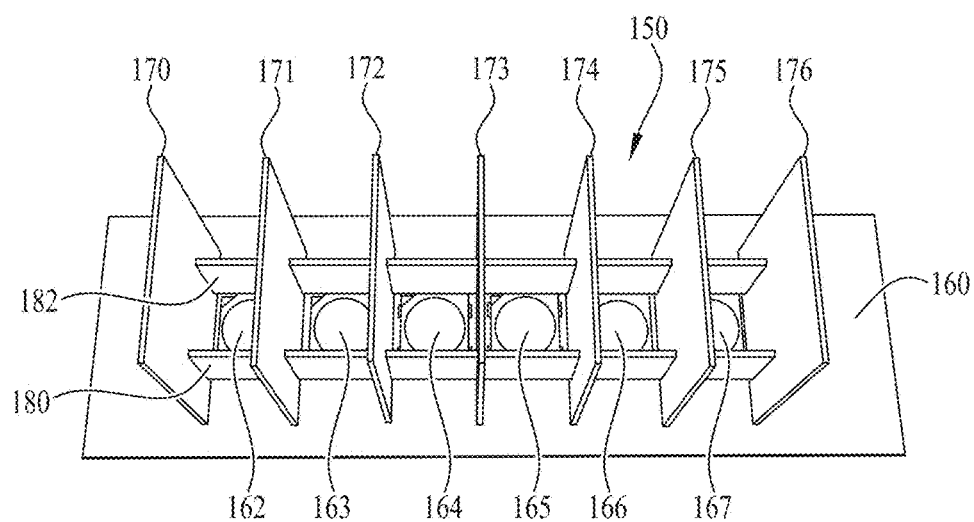
FIG. 7 is a perspective front view of an alternate illumination module for a data reader as in FIGS. 5-6.

FIG. 7 is a perspective front view of an example illumination array module 150 comprised of a plurality of LEDs 162, 163, 164, 165, 166, 167 that are mounted on a circuit board 160. A simple array of shorter baffles, exemplified by baffles 180, 182 provides for a wide angle of emission in the scanning direction (but not in direct line of sight to the operator) and an array of orthogonal baffles, such as baffles 170, 171, 172, 173, 174, 175, 176 creates a narrow angle emission in the orthogonal direction, keeping the light out of the operator's eyes. Together, the baffles 170-176 and 180, 182 form a reflector housing about the LED light source. The internal surfaces of the baffles 170-176 and 180-182 are made of a similar material, such as absorbing black plastic, and have a very smooth, polished finish on their surfaces closest to the sources to improve illumination efficiency. The smooth, polished black plastic internal surface is operative such that low incidence angle light A is absorbed, while high incidence angle light B is reflected.

The baffle structure of the illumination array module 150 of FIG. 7 may be described as a reflector housing comprised of a generally rectangular cross-section. Taking for example the baffle structure surrounding light source 162, the baffle structure comprises with opposing inner side surfaces of the baffles 170, 171 and 180, 182 comprising (a) a top inner surface and a bottom inner surface opposite thereto (of baffles 180, 182) and (b) a left inner surface and a right inner surface opposite thereto (of baffles 170, 171), wherein a light source (e.g., 162) disposed proximate the rear end of the reflector housing and operative to generate illumination out through the reflector housing along an outgoing illumination path, wherein at least one of inner surfaces of the baffles of the reflector housing comprises a reflective surface operative (a) to exhibit high reflectivity to light rays from the light source impinging at a high incidence angle and (b) to exhibit low reflectivity to light rays from the light source impinging at a low incidence angle.

The reflector housing formed by the baffles 170, 171 shown in FIG. 7 may be described to be formed in a rectangular cross-section, the cross-section being constant in area from its end proximate the LED 162 to its end distal to the LEDs. Alternately, the cross-section may be formed increasing from its end proximate the LEDs to its end distal to the LEDs, thus forming a cone-shaped structure. Alternately, the reflector housing shape may be formed in any suitable form, such as with a polygonal cross-section selected from the group consisting of: triangular, rectangular, pentagonal, and hexagonal cross-sections.

Figure 8:
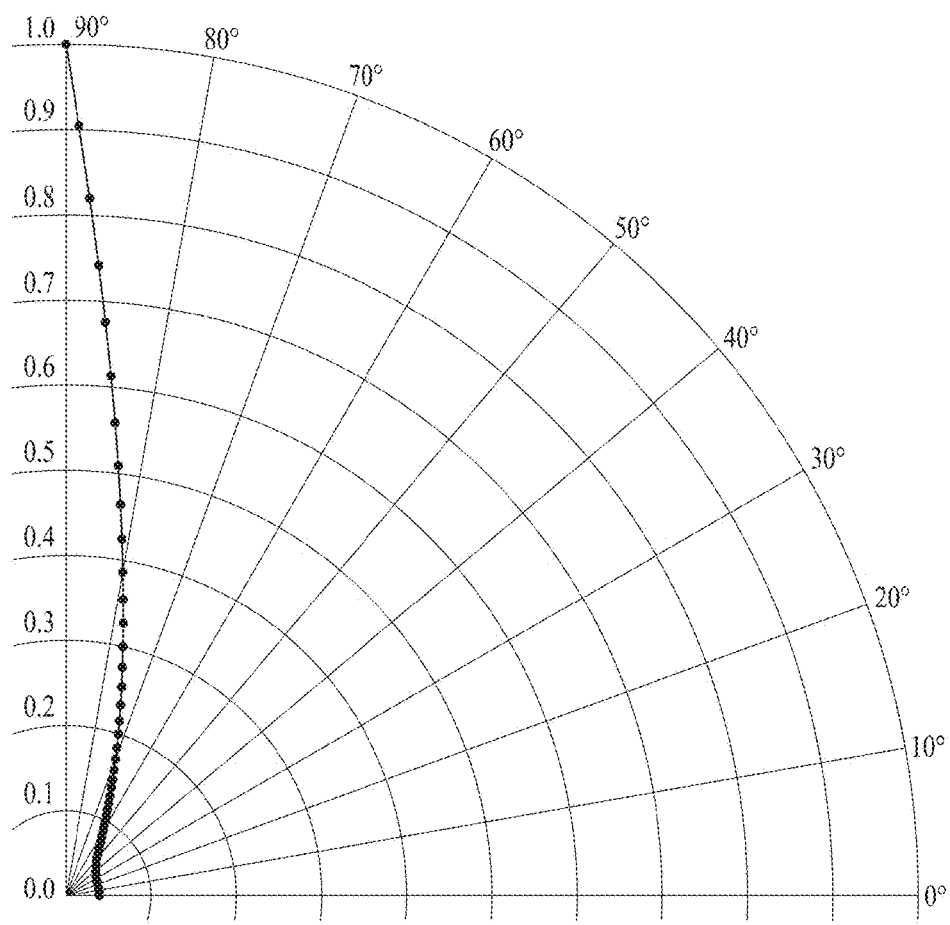
FIG. 8 is a plot illustrating Fresnel reflection of randomly polarized light from a dielectric surface.

To illustrate reflectivity of a dielectric surface, FIG. 8 is a polar plot of the phenomenon of Fresnel reflection of randomly polarized light from a smooth 1.5 index dielectric surface surrounded by air. The incidence angle is in degrees along the perimeter of the circle, and reflectivity is on the vertical axis. If the incidence angle is fairly low, such as up to 70° as exemplified by ray A' of FIG. 5, the average reflection is 20 percent or less. This light would typically be in the angular range which may enter the eyes of the operator. As the incidence angle increases further, an increasing amount of flux is reflected, approaching 100 percent at grazing incidence, such as represented by ray B' in FIG. 5. This relative reflectivity efficiency is exactly what is desired whereby the light flux with the correct (narrow) angular range is reflected and passed out of the scanner with high efficiency. By constructing the baffles from a dielectric material such as smooth black plastic, the light not included in Fresnel reflection is passed into the material and absorbed to a large degree, further reducing stray light that would exit the baffles at a wide angle.

FIG. 9 is a polar plot of an example of the combined effects of the specular Fresnel reflection, which mainly affects the extra efficiency gained by source flux reflecting at grazing angles from the baffle surfaces, along with stray light diffuse "glow" scattered by the baffle material at all angles, which is seen by the operator. This diffusing component is determined by the reflectivity of the material, which in FIG. 9 is assumed to be 0.1, or 10 percent of incident radiation. The plot in FIG. 9 illustrates that at low incidence angles the material reflectance is dominant and essentially constant, finally giving way to the Fresnel component at high incidence angles.

Any suitable light generator including LEDs, VLDs, VCSELs, incandescent lights, gas discharge lamps or the like may be employed. Different types of light generators, such as the LEDs 104, 106 (of FIGS. 5-6), may emit light in different directional patterns. For example, incandescent lamps and gas-discharge lamps commonly emit light omnidirectionally, with the exception of areas blocked from emitting light such as socket portions of the lamps. Many LEDs emit light in a spatial distribution, for example, a spatial distribution of 120°. Lenses or other optic devices may be included with an LED to change the spatial distribution, for example, by narrowing the spatial distribution to a viewing angle of 60° or 30° or some other desired viewing angle.

The LED in a preferred application has a light wavelength of 660 nm. Such light wavelength is toward the low sensitivity side of human eye visibility. Other wavelengths may be employed such as 680 nm or 690 nm, but though such wavelength LEDs may be less visible (and thus less distracting if in line of sight of the user), currently those wavelength LEDs tend to be higher cost and less reliable. A suitable LED is the Advanced Power Top View LED model EHP-A09K available from Everlight Electronics Co. Ltd. of Taipei, Taiwan. Multi-wavelength LEDs in the visible range (e.g., white light) may also be employed, but such wavelengths may be less effective or responsive illumination for certain imagers, and the illumination may appear brighter and more distracting to the user.

Light emitted from LEDs and other light sources may tend to be concentrated in a relatively narrow spatial distribution, and thus may appear to viewers as concentrated point sources of light. To further reduce direct brightness to the user, an optional diffusing element (such as diffuser 119 shown in FIG. 5) may be disposed in an outgoing light path. The diffuser 119 may be disposed at 90° to the baffle housing (as in FIG. 5), or may alternately be disposed at a tilt angle of about 45° such as for example as disclosed in U.S. Pat. No. 9,305,198 hereby incorporated by reference. The diffuser 119 may comprise a single piece of diffuser material, but may be made from separate pieces of diffuser materials, and may be constructed from any suitable diffusing material. Interposing the diffuser 119 in the outgoing illumination path may provide advantages such as one or more of the following: (a) reducing specular highlights, (b) diminishing the harsh appearance of point sources of light, or (c) providing a final appearance of a bar of light to a viewer. A bar of light appearance is generally rectangular-shaped and may include a uniform light distribution over the surface. A bar of light appearance may include regions of higher intensity light, but preferably such high intensity regions do not appear to a viewer to be individual points of light.

Adding a diffuser surface over the face of hollow reflectors may make bright point sources more visually appealing, for example, by reducing specular highlights. Moreover, so as not to offset the reduction of intensity of stray light rays provided by the dielectric baffle structure, the diffuser 119 may preferably be made of specialized holographic or other controlled-angle diffusive materials that may also reduce stray light generation, for example, the Luminit Light Shaping Diffuser® sheet available from Luminit Technologies of Torrance, Calif.

Further details and alternate constructions that may be combined with the baffles and/or illumination module are described in U.S. Pat. No. 9,305,198 or 9,135,484 hereby incorporated by reference.

The structure and/or orientation of the baffles may be selected to provide the desired reflectivity effect depending upon the expected position of the user or customer. For example, if a user/customer is in a position at a left side of an illumination module (with the module projecting out of either a vertical or horizontal window), the module housing may be constructed with an extended/elongated baffle on the left side.

Figure 12:
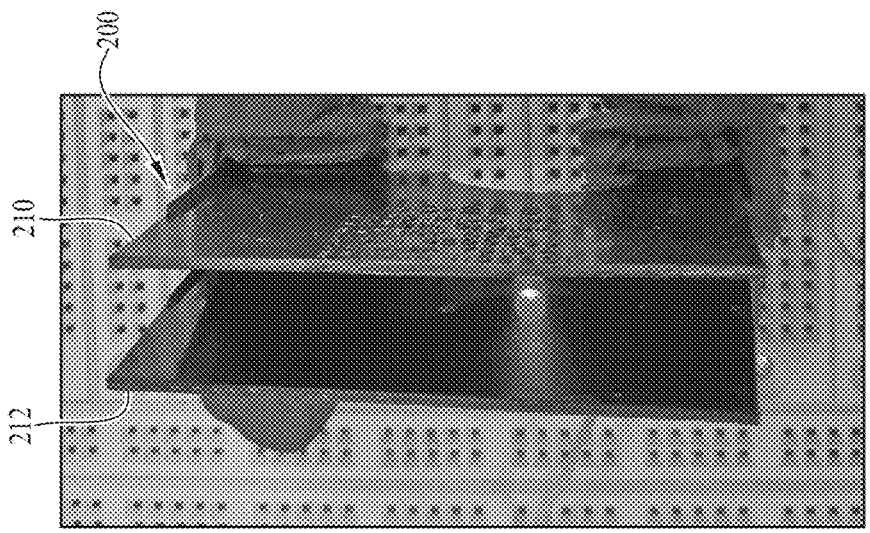
FIGS. 10-12 are three views of a test structure illustrating reflectivity of light relative to incidence angle.
Figure 11:
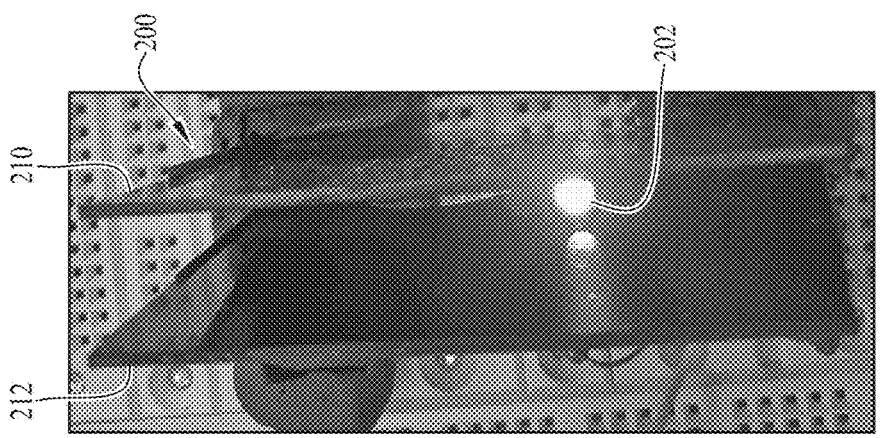
Figure 10:
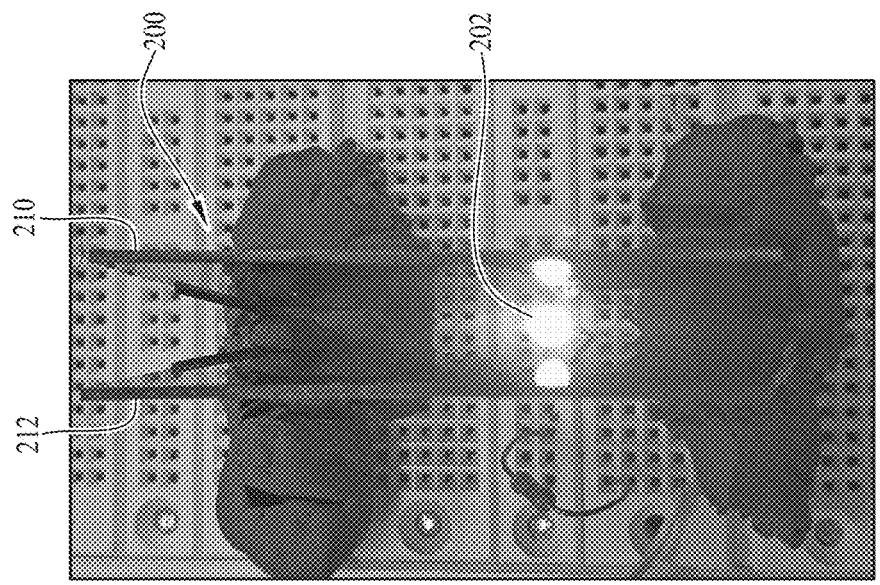

FIGS. 10-12 are three views of a test structure for an illumination module 200 illustrating reflectivity of light relative to incidence angle. The illumination module 200 includes a single LED 202 disposed between first and second baffles 210, 212 made of smooth, polished black plastic material.

FIG. 10 illustrates an on-axis view looking directly at the source LED 202. In this view, the smooth dielectric surfaces of the baffles 210, 212 provide high intensity reflections (the angle of incidence being high) which also propagate essentially in the same general desired direction as the source LED 202, helping to add some efficiency lost by lack of metallization of the reflective surfaces.

FIG. 11 illustrates a moderate off-axis view to the source LED 202. The primary reflected image of the LED 202 by the baffle 212 is substantially dimmer, and the secondary reflection is very dim (because of the lower incidence angle). This dimming effect is beneficial because higher off-axis light (with the lower incidence angle) is more likely to be seen by the operator.

FIG. 12 illustrates a large angle off-axis view of the light from the source LED 202. The direct view of source LED 202 is now blocked from view by the baffle 210. The primary reflected image of the LED by the baffle 212 is very dim, and the secondary reflection is even dimmer (because of the even lower incidence angle). Thus the operator has much less light in his/her eyes than in the on-axis case.

Though described primarily with respect to a checker-assisted data reader, the readers and methods described herein may be employed in a self-checkout system. The optical readers described herein may be employed in an automatic reader, such as a tunnel scanner employing multiple housing portions that obtain multiple perspectives through multiple viewing windows.

Other embodiments are envisioned. Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the inventions.

The invention claimed is:

1. A data reader comprising:
   a reader housing having a window; and
   an illumination module disposed in the reader housing, the illumination module comprising:
      a reflector housing comprised of a baffle structure of at least a first baffle and a second baffle disposed opposite and facing the first baffle; and
      a light source disposed at the rear end of the reflector housing and operative to generate illumination out through the reflector housing along an outgoing illumination path,
   wherein at least one inner surfaces of the baffles comprises a dielectric material operative (a) to exhibit high reflectivity greater than approximately 0.7 to light rays from the light source impinging at high incidence angles above about 85 degrees and (b) to exhibit low reflectivity less than approximately 0.3 to light rays from the light source impinging at low incidence angles below 70 degrees.

2. A data reader according to claim 1, wherein the dielectric material comprises a smooth polished black plastic.

3. A data reader according to claim 1, wherein the baffle structure has an increasing cross-sectional area from a rear end proximate to the light source to a front end distal to the light source.

4. A data reader according to claim 1 further comprising a diffuser disposed in the reflector housing in the outgoing illumination path.

5. A data reader according to claim 1, wherein the dielectric material has a refractive index of approximately 1.5.

6. A data reader according to claim 1, wherein the dielectric material exhibits low reflectivity of 0.2 or less for low incidence angles below 70 degrees.

7. A data reader comprising:
   a reader housing having a window; and
   an illumination module disposed in the reader housing behind the window, the illumination module having:
      a reflector housing comprised of a generally rectangular cross-section, with opposing inner side surfaces comprising (1) a top inner surface and a bottom inner surface opposite thereto and (2) a left inner surface and a right inner surface opposite thereto; and
      a light source disposed proximate the rear end of the reflector housing and operative to generate illumination out through the reflector housing along an outgoing illumination path,
   wherein at least one of inner surfaces of the reflector housing comprises a reflective surface operative (a) to exhibit high reflectivity greater than approximately 0.7 to light rays from the light source impinging at high incidence angles above about 85 degrees and (b) to exhibit low reflectivity less than approximately 0.3 to light rays from the light source impinging at a low incidence angles below 70 degrees.

8. A data reader according to claim 7, wherein the reflective surface comprises a smooth polished black plastic.

9. A data reader according to claim 7, wherein the reflector housing comprises a cone-shaped structure increasing in cross-sectional area from the rear end proximate the light source to the front end distal to the light source.

10. A data reader according to claim 7, wherein the reflector housing comprises a baffle structure including a first baffle disposed on first side of the light source and a second baffle disposed on a second side of the light source opposite to and facing the first baffle.

11. A data reader comprising:
   a reader housing constructed and arranged for installation at a checkstand, the reader housing having a window; and
   an illumination module disposed in the reader housing, the illumination module comprising
      a reflector housing comprised of a baffle structure of generally polygonal cross-section, with a first inner surface and a second inner surface; and
      a light source disposed at a rear end of the reflector housing and operative to generate illumination out through the reflector housing along an outgoing illumination path,
   wherein at least one of inner surfaces of the reflector housing comprises a dielectric material operative (a) to exhibit high reflectivity greater than approximately 0.7 to light rays from the light source impinging at a high incidence angles above about 85 degrees and (b) to exhibit low reflectivity less than approximately 0.3 to light rays from the light source impinging at a low incidence angles below 70 degrees.

12. A data reader according to claim 11, wherein the dielectric material comprises a smooth, polished black plastic.

13. A data reader according to claim 11 further comprising a diffuser disposed in the reflector housing in the outgoing illumination path.

14. A data reader according to claim 11, wherein the baffle structure has an increasing cross-sectional area from a rear end proximate to the light source to a front end distal to the light source.

15. A data reader according to claim 11, wherein the polygonal cross-section is selected from the group consisting of: triangular, rectangular, pentagonal, and hexagonal cross-sections.

16. A data reader comprising:
   a reader housing having a window; and
   an illumination array module disposed in the reader housing, the illumination module comprising:
      a reflector including:
         a first set of baffles arranged in a first direction; and
         a second set of baffles arranged in a second direction orthogonal to the first direction forming an array, wherein the first set of baffles have shorter lengths than the second set of baffles; and
      light sources disposed at the rear end of the reflector housing and distributed within spaces within the array, the light sources operative to generate illumination out through the reflector housing along an outgoing illumination path,
   wherein the reflector is arranged in the reader housing to provide for a wide angle of emission from the light sources in a scanning direction of the data reader, and to provide for a narrow angle emission from the light sources in a direction orthogonal to the scanning direction, and
   wherein inner surfaces of the baffles comprise a dielectric material operative (a) to exhibit high reflectivity greater than approximately 0.7 to light rays from the light source impinging at high incidence angles above about 85 degrees and (b) to exhibit low reflectivity less than approximately 0.3 to light rays from the light source impinging at low incidence angles below 70 degrees.

17. A data reader according to claim 16, wherein the reader housing is disposed in a work surface of a retail scanner.

18. A data reader according to claim 16, wherein the reader housing is disposed in a checkstand counter of a retail location, and the direction orthogonal to the scanning direction is a direction toward eyes of a user of the checkstand counter.

19. A data reader according to claim 16, wherein the reader housing is disposed in a self-checkout station, and the direction orthogonal to the scanning direction is a direction toward eyes of a user of the self-checkout station.

20. A data reader according to claim 16, wherein the dielectric material is a black plastic material.

\* \* \* \* \*